Patented Oct. 12, 1926.

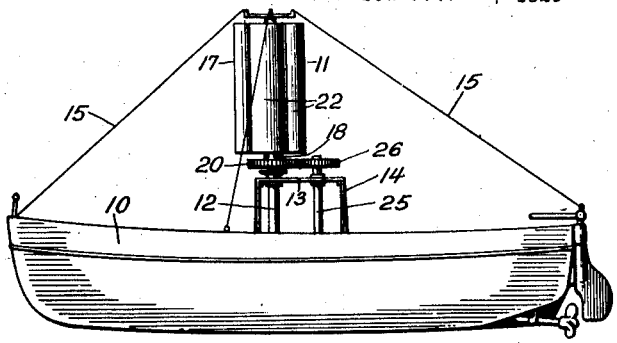
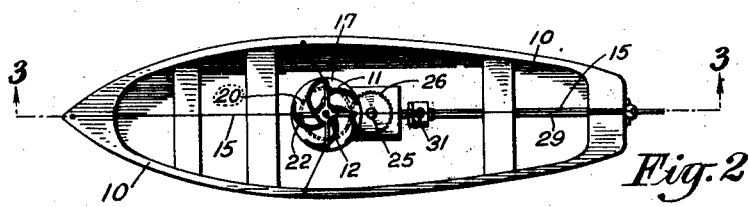
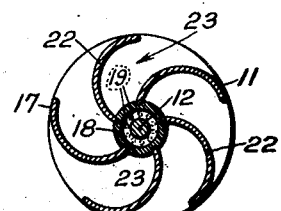
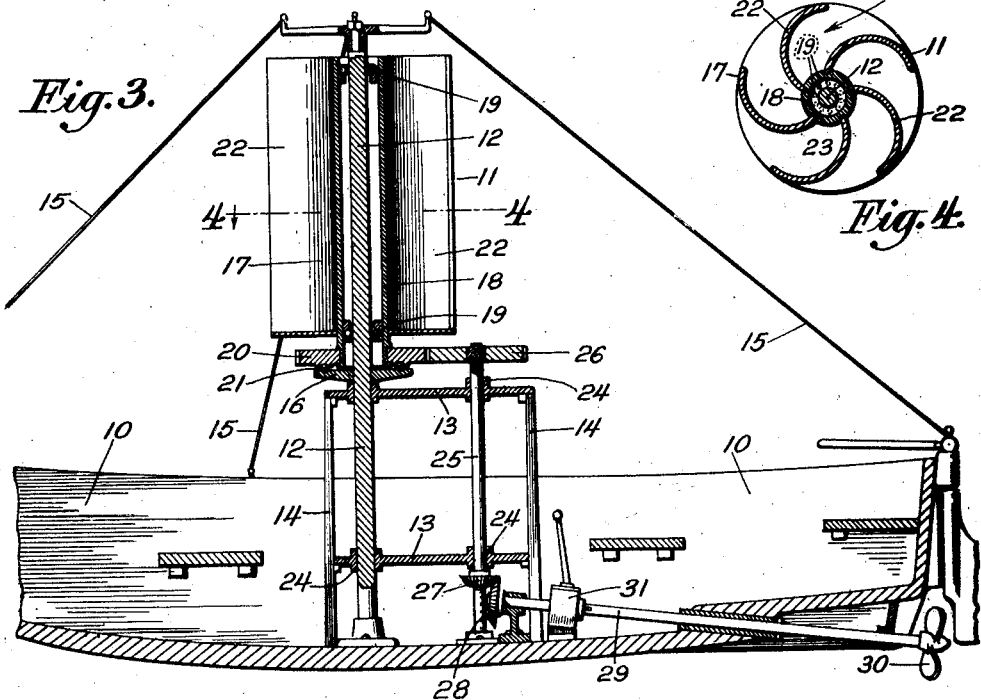

1,602,853

UNITED STATES PATENT OFFICE.

PATRICK J. MAHER, OF NEW YORK, N. Y.

WIND TURBINE.

Application filed October 29, 1925. Serial No. 65,677.

This invention relates to improvements in wind motors or turbines in which the force of the wind is utilized for producing power.

The principal object of the invention resides in a wind motor for installation in a boat for propelling the same, and is especially adaptable to small craft such as life boats for emergency use.

Another object of the invention is to provide a wind motor having a rotatable element which is operable by the wind irrespective of the direction from which the wind is blowing so that the same may be capable of operation under all wind conditions.

A further object of my invention is to provide a wind motor which is simple in construction, easy to assemble for use and inexpensive of manufacture.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a side elevational view of my invention installed in a boat.

Figure 2 is a top plan view of the same.

Figure 3 is an enlarged vertical sectional view on the line 3—3 of Figure 2.

Figure 4 is a horizontal sectional view on the line 4—4 of Figure 3.

Referring more particularly to the drawing, the reference numeral 10 designates a boat which in the present instance is shown as a life boat in which my improved wind motor 11 is installed. Although I have shown the motor within the boat for driving the same, I wish it to be understood that the same is capable of many other uses.

Rising from the bottom of the boat 10, is a rod or shaft 12 which is rigidly supported by cross pieces 13 supported by posts or standards 14. Guy wires 15 connect with the tops of the posts and with the ends of the boat to rigidly support the same in a vertical position.

A collar 16 is fixed to the rod or shaft 12 and supports a rotatable member 17. The member 17 comprises a tube 18 which encircles the upper end of the shaft 12 and is held therefrom by ball bearings 19 at opposite ends of the tube. The lower end of the tube has a gear 20 fixedly connected therewith and a ball race 21 is interposed between the gear 20 and the collar 16. By providing ball bearings 19 and the ball race 21, it will be seen that the member 17 is free to rotate about the shaft 12.

Extending from the tube 18 are radially arranged wings or veins 22, which are curved so as to provide pockets 23 between the same. It will be seen by referring to Figure 4, that no matter from which direction the wind may be blowing, the member 17 will be subject to rotation by the force of the same.

Journalled in bearings 24 and disposed in parallel relation to the shaft 12 is a shaft 25 having a gear 26 at its upper end for constant mesh with the gear 20, and a beveled gear 27 at its other end for meshing with the beveled gear 28 fixed to one end of the propeller shaft 29. The other end of the shaft 29 carries the usual propeller 30.

From the foregoing description, it will be seen that a boat may be propelled by the force of the wind, as the member 17 will be rotated, which in turn transmits power to the shaft 25 through the co-acting gears 20 and 26, and which motion is later transmitted to the propeller shaft 29 through the beveled gears 27 and 28. If desired, a suitable clutch mechanism 31 may be provided for engaging and disengaging the gear 28 with the gear 27 so that the power to the propeller shaft may be cut off.

While I have shown and described what I consider to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claim.

What is claimed as new is:—

In a wind turbine, the combination of a stationary shaft, a rotatable member supported by said stationary shaft, said rotatable member comprising a central tubular shaft through which said stationary shaft extends, a plurality of equi-distantly spaced curved wings extending radially from said tubular shaft whereby the maximum force of the wind may act upon said wings irrespective of the direction from which the wind may be blowing for rotating said tubular shaft, a driven shaft, and transmission means for imparting movement from said tubular shaft to said driven shaft.

In testimony whereof I have affixed my signature.

PATRICK J. MAHER.